Sept. 22, 1964 W. J. BOGERT, JR 3,149,659
AUTOMOBILE REPAIR APPARATUS
Filed July 18, 1961 2 Sheets-Sheet 1
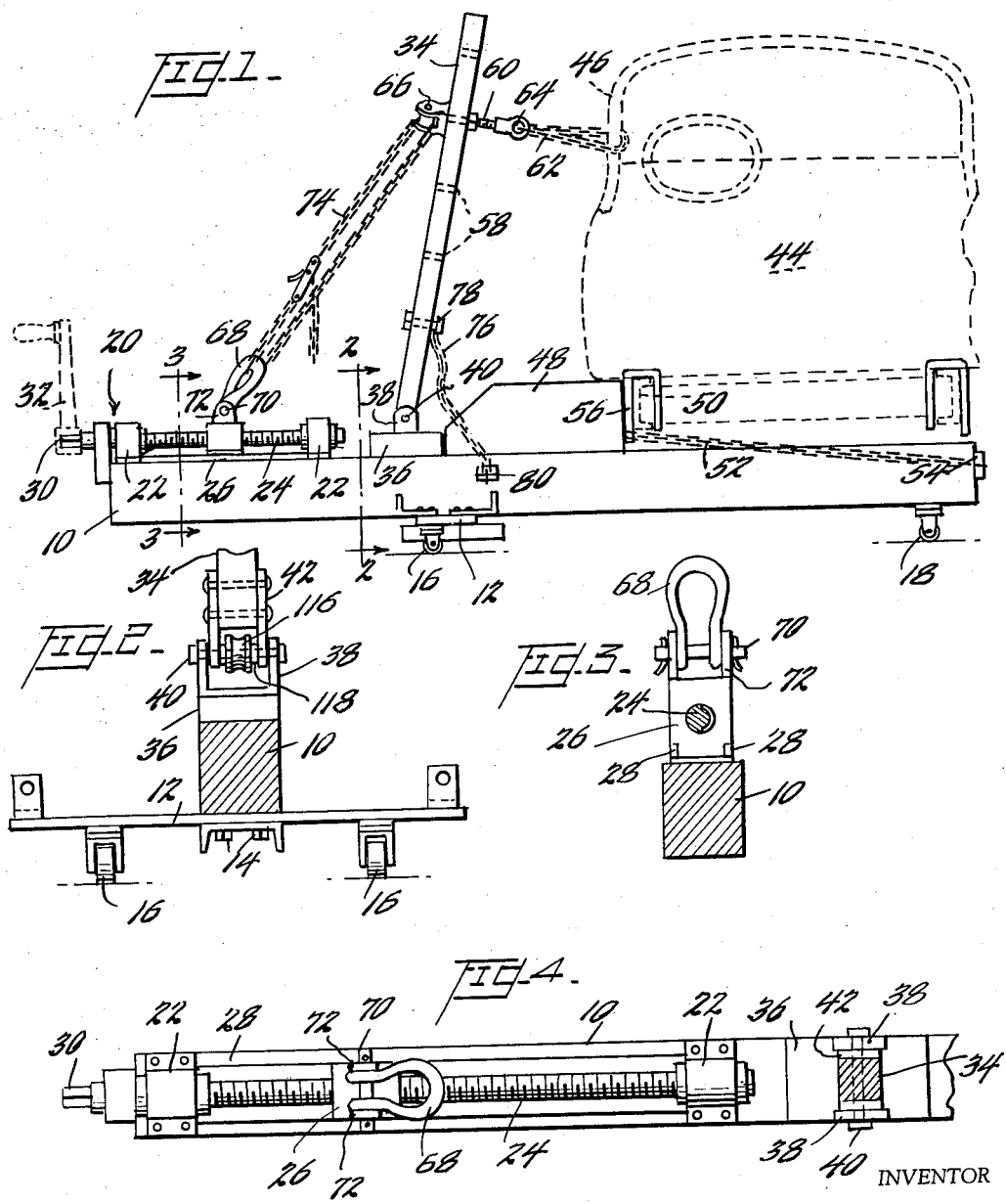
INVENTOR
Walter J. Bogert, Jr.,
BY
ATTORNEYS

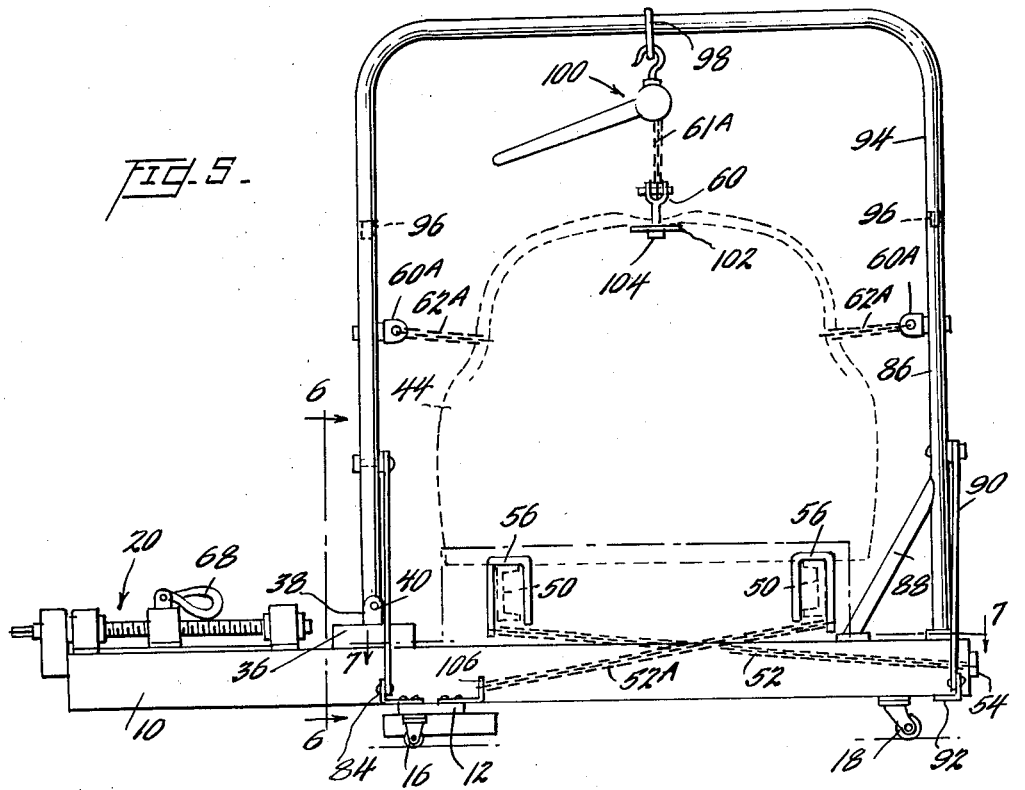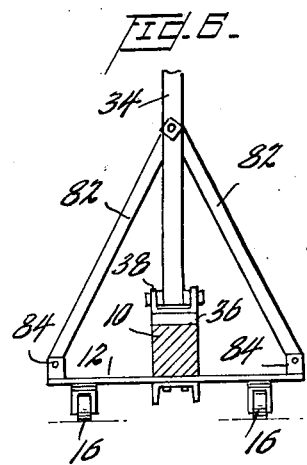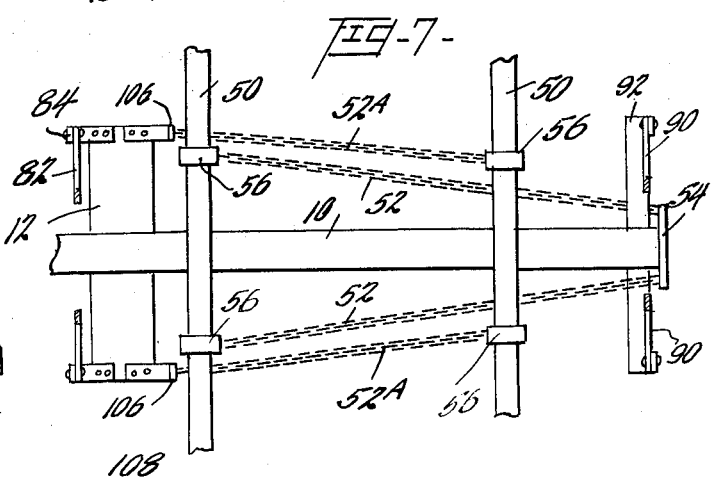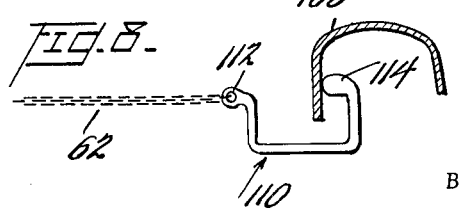

United States Patent Office 3,149,659
Patented Sept. 22, 1964

1

3,149,659
AUTOMOBILE REPAIR APPARATUS
Walter J. Bogert, Jr., 514 W. McPherson, Nashville, Ga.
Filed July 18, 1961, Ser. No. 124,942
5 Claims. (Cl. 153—32)

This invention relates to apparatus for automobile repair, more particularly for the repair of collision damage.

It is always desirable to repair automobile collision damage, if only for aesthetic reasons. However, it has long been recognized that damage resulting in misalignment of parts frequently resulted in unequal wear of other parts of the automobile remote from the actual damage itself.

More recently, there has been a growing trend to what is commonly called unit construction, wherein a greater amount of the stresses are taken by the body itself with consequent reduction in the amount of weight put into the chassis. In such construction, body repairs must be made more painstakingly because the body skin requires consideration for its load carrying capacity rather than as a mere decorative device.

Apart from damage resulting from organic weakness in an individual design, it is recognized that each case of damage is one requiring individual consideration. Consequently, any body repair apparatus must be designed to cope with all types of damage or at least all types of one or more classes of damage.

It is the objective of this invention to provide a relatively simple basic apparatus, useful for some repairs without substantial modification.

Additionally, in furtherance of the primary objective, a series of auxiliary elements are provided which, when used individually or in groups with the main apparatus, may serve to repair additional classes of damage.

Other objectives will be apparent as the description proceeds.

For a fuller understanding of the invention, reference should be had to the drawings accompanying this application, wherein:

FIGURE 1 is a side elevation of one aspect of the invention, being employed to repair damage to the side of an automobile;

FIGURE 2 is an enlarged section of a portion of FIGURE 1, taken along the line 2—2 of FIGURE 1;

FIGURE 3 is another section taken along the line 3—3 of FIGURE 1;

FIGURE 4 is a plan view, to an enlarged scale, of the left hand portion of FIGURE 1, with certain auxiliary parts being disconnected;

FIGURE 5 is another side elevation of the apparatus, arranged for a different type of repair work;

FIGURE 6 is an elevation, partly in section, the section being taken along the line 6—6 of FIGURE 5;

FIGURE 7 is a plan view of the apparatus shown at the right of FIGURE 5, with numerous parts omitted for simplicity; and FIGURE 8 is a fragmentary view, partly in section showing the use of an attachment.

Referring now to the drawings, particularly FIGURES 1 to 4 and 7 thereof, the numeral 10 designates a large beam conveniently of wood 14 to 16 feet long and having a section 4 by 6 inches or larger. Toward one end, there is secured an under-beam plate 12 by means of

2 bolts 14. At least two rollers 16 are secured to the underside of the under-beam plate to facilitate end-wise movement of the beam. Near the opposite, outer end of the beam, one or more casters 18 are provided to support this end of the beam for movement.

A screw jack generally designated by the numeral 20 is mounted upon the inner end of the beam. It is made up of a pair of bearing blocks 22 for mounting the screw 24 for rotation. Upon the screw, a nut 26 is confined by guides 28, running lengthwise of the screw. A suitable configuration of the operative head 30 of the screw, for example square, permits the application of a removable handle 32.

A pivot bar 34 is mounted inwardly of the inner end of the beam. A base block 36 is firmly secured to the top of the beam in any suitable manner, being generally located above the under-beam plate 12. The pivot bar 34 is mounted for swinging movement in a plane passing vertically through the axis of the beam by means of clevis 38 and clevis bolt 40 passing through a hole drilled through the end of the pivot bar. Alternatively as shown in FIGURE 2, pivot holes pass through extension plates 42 secured to the lower end of the pivot bar.

For the purposes of this illustration, it will be assumed that the automobile 44 has been injured by the inward bending of an upper side post 46. To restore this post to its proper configuration, the automobile is first jacked up as required and the beam wheeled under the car in general alignment with the post to be repaired. In order to limit endwise movement of the beam 10, during the repair operation, a block 48 may be placed between the base block 36 and the frame 50 of the automobile. Alternatively, as best shown in FIGURE 7, movement may be limited by means of tie chains 52 extending from yoke 54 secured at the outer end of the beam and connected by means of C-hooks 56 to the frame 50. The selection for the points for location of the C-hooks is a matter dependent upon the construction of the automobile undergoing repair. It is generally desirable to place them close to points where cross braces intersect the longitudinal frame member. It is desirable to have a selection of blocks 48 of varying lengths to enable most effective placement of the repair apparatus. Depending upon the nature of the work and the convenience of the operation, either the block 48 or the chains 52 or both may be employed.

A series of holes 58 are provided in the pivot bar 34 for the accommodation of the shank of Y-bolt 60. The pull chain 62 by means of which the side post 46 is to be restored to its proper shape, is wrapped around the side post with suitable wood and cloth padding and thence secured by clevis bolt 64 passing through the clevis arms of the Y-bolt 60. Another clevis 66 is secured upon the shank of Y-bolt 60 upon the side of pivot bar 34 opposite the point of attachment of the pull chain 62.

A swingable hitch eye 68 is secured by pin 70 passing through the lugs 72 extending upwardly on the screw nut 26. The hitch eye 68 is connected to the clevis 66 by the jack pull chain 74. Outward movement of the pivot bar 34, toward the jack 20 is limited by the safety chain 76, connected to the pivot bar at 78 and to the beam at 80. It will be readily understood that any of the chains 52, 62, 74 or 76 may be adjustable as to length and, in practice, most of them are adjustable. It will also be understood that other flexible connections such as cables may be employed in place of the chains at one or more points.

It will now be convenient to described the operation of the apparatus thus far detailed. As previously mentioned, the car is jacked sufficiently to permit the outer end of the beam to be pushed under it a suitable distance and the beam is braced either by block 48 or chains 52 against lengthwise movement with respect to the car. The Y-bolt 60 is located on the pivot bar 34 in such manner as to most effectively direct the outward pull of chain 62. The chains 62 and 74 are connected with minimum slack, while the chain 76 is provided with sufficient slack to limit the outward maximum movement of the pivot bar. Cranking of the screw 24 by the handle 32 exerts a powerful but effectively controllable pull upon the element to be repaired. The apparatus arranged substantially as set forth, is generally applicable to repairs to the front, side and rear of automobiles where the back side of the damaged part is accessible from the front.

Turning now to FIGURES 5 to 7, the pivot bar may be held in upright position by means of side braces 82 utilizing a bolt passing through one of the holes 58 and other bolts passing through the lugs 84 on the outer arms of under plate 12. At the outer end of the beam 10 there is provided a thrust bar 86 having longitudinal brace 88. As the thrust bar must be removed from time to time, it is desirable to make the bar 86 and the brace 88 of unitary construction with suitable bolts or other means for fastening them to the outer end of the beam. The bar 86 may also have a pair of side braces 90 connected to a cross support 92 upon the underside of the beam.

An arbor-shaped overhead bar 94 is supported at its end upon the pivot bar 34 and the thrust bar 86 by means of pin-and-socket joints 96. An oval ring 98, slidable upon the overhead bar 94, affords a connecting support for ratchet jack 100.

As illustrated in FIGURE 5, the apparatus is being employed to pull out a large dent in the roof of an automobile. For this type of work, a hole is made in the thin metal of the top to permit passage of the shank of the Y-bolt 60. The shank is passed through the hole and thence through a hole in the center of distributing plate 102 followed by a nut 104 to hold the assembly together. According to the contour of the dent to which it is desired to distribute the pulling effect, the plate 102 may be a square, an elongated rectangle, a disc or an oval. After the dent has been removed, the hole cut for entry of the Y-bolt may be patched and filled. It is usually necessary to refinish the surface so little harm is caused by the deliberate incision into panel.

Before applying a pull by means of jack 100, the repair apparatus may be hooked up to the automobile by application of the tie chains 52 in the manner previously described. Also, the tie chains 52A attached to the lugs 106 mounted on the under-beam plate 12, may be secured to the frame member opposite that to which the tie chains 52 are secured. Additionally, Y-bolts 60 mounted on the upper portions of pivot bar 34 and thrust bar 86, serve to mount the chains 62A upon suitable upper portions of the automobile.

This arrangement of the apparatus permits the successful application of upward pull upon any appropriate part of the automobile for repair purposes. Where necessary, the chain may be used directly as in the previous modification and conversely a side panel may be pulled by Y-bolt and plate as disclosed immediately above.

For portions of the automobile where access may be had to the reverse side of the damaged part, from the front side, such as fender 108 shown in FIGURE 8, a pulling iron 110 may be employed. This tool has the general configuration of a C-clamp with a point for attaching chain 62, designated by reference numeral 112, and a generally rounded, inwardly turned, operative head 104. This implement is effective upon bumpers, bumper elements, fenders, portions of the roof and many similar appendages of an automobile. It may be used with either the arrangement of FIGURE 1 or that of FIGURE 5.

In some instances, a downward pull may be necessary either by itself or in conjunction with one of the previously mentioned operations. Referring to FIGURE 2, between the extension plates 42, there is mounted a freely rotatable wheel 116, together with spacer plates 118 on each side thereof, on the clevis bolt 40. The wheel 116 is grooved and serves to guide a cable, not shown, which may be connected at one end to the hitch eye 68 and at the other to a suitable workpiece, depending upon the configuration of the item to be pulled.

It will be apparent that, depending upon the nature of the damage to be repaired, the relative sizes and shapes of several of the implements may need to be varied in obvious manners. It is also apparent that, while the apparatus has been primarily devised for the repair of automobile bodies, it is, none the less, readily useful for numerous other automobile servicing objectives.

I claim:

1. Apparatus for automobile repair including an elongated beam, a first bar adapted to be secured in upright position adjacent one end of said beam, means for securing said bar to said beam, a pivot bar adapted to be secured inwardly of the second end of said beam, means mounting said pivot bar on said beam, an arbor member including a horizontal run and a pair of vertical elements, each of said vertical elements having a portion interfitting with the outer ends of the first and pivot bars, one to each, a plate-like support member removably secured to the beam upon the face opposite to that upon which the first and pivot bars are secured, said support extending outwardly upon both sides of the point of attachment and a pair of braces extending from the outer ends of the support upwardly and inwardly to the pivot bar, said braces being removably secured at their points of attachment, said arbor member serving to support an implement for automobile repair.

2. Apparatus for automobile repair including an elongated beam, a first bar adapted to be secured in upright position adjacent one end of said beam, means for securing the bar to said beam, flexible means for connecting the free end of said first bar to a portion of the automobile, a pivot bar secured inwardly of the second end of said beam, flexible means for connecting the free end of said pivot bar to a portion of the automobile, means mounting said pivot bar on said beam, and an arbor member including a horizontal run and a pair of vertical elements each of said vertical elements having a portion interfitting with the outer ends of the first and pivot bars, one to each, said arbor member serving to support an implement for automobile repair.

3. Apparatus for automobile repair including an elongated beam adapted for horizontal positioning, a first bar secured in upright position adjacent one end of said beam, a pivot bar secured inwardly of the second end of said beam, an arbor member including a horizontal run and a pair of vertical elements, each of said vertical elements having a portion interfitting with the outer ends of the first and pivot bars, one to each, a plate-like support member removably secured to the underface of said beam, said support member secured beneath said pivot bar and extending outwardly upon both sides of the point of attachment, brace means secured to said pivot bar and said plate-like support member, first flexible tie means secured to said support member and second flexible tie means secured to said one end of said beam, the free ends of both said tie means adapted for attachment to a workpiece for securing the same to said apparatus, said arbor member serving to support an implement for automobile repair.

4. The apparatus of claim 3 wherein said first and pivot bars are provided with flexible tie means adapted for attachment to a portion of said workpiece adjacent each said bars.

5. The apparatus of claim 3 wherein said flexible tie means are each attached to said workpiece at points opposite their points of securance to said beam and said support member respectively, thereby providing optimum rigidity of said workpiece with respect to said apparatus.

References Cited in the file of this patent

UNITED STATES PATENTS

| | | |
|---|---|---|
| 1,676,263 | Hawkins | July 10, 1928 |
| 2,442,604 | Johnson et al. | June 1, 1948 |
| 2,559,250 | Jackson | July 3, 1951 |
| 2,597,234 | Elam | May 20, 1952 |
| 2,717,020 | Dobias | Sept. 6, 1955 |
| 2,757,705 | Johnson | Aug. 7, 1956 |
| 2,836,220 | Johnson | May 22, 1958 |
| 2,979,102 | Ferguson et al. | Apr. 11, 1961 |
| 2,998,837 | Luedicke et al. | Sept. 5, 1961 |
| 3,027,930 | Padgett | Apr. 3, 1962 |
| 3,029,859 | Grant | Apr. 17, 1962 |